US007795339B2

(12) United States Patent
Monsheimer et al.

(10) Patent No.: US 7,795,339 B2
(45) Date of Patent: Sep. 14, 2010

(54) POWDERY COMPOSITION OF A POLYMER AND A FLAMEPROOFING AGENT CONTAINING AMMONIUM POLYPHOSPHATE, METHOD FOR THE PRODUCTION THEREOF, AND MOULDED BODY PRODUCED FROM SAID POWDER

(75) Inventors: Sylvia Monsheimer, Haltern am See (DE); Maik Grebe, Bochum (DE); Franz-Erich Baumann, Duelmen (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 12/332,607

(22) Filed: Dec. 11, 2008

(65) Prior Publication Data
US 2009/0088508 A1    Apr. 2, 2009

Related U.S. Application Data

(63) Continuation of application No. 10/565,779, filed as application No. PCT/EP2004/051009 on Jun. 3, 2004, now abandoned.

(30) Foreign Application Priority Data

Jul. 25, 2003    (DE) ................... 103 33 936
Jan. 8, 2004     (DE) ................. 10 2004 001 324

(51) Int. Cl.
    *C08K 3/32*    (2006.01)
(52) U.S. Cl. ....................................... 524/416
(58) Field of Classification Search ................. 524/416
    See application file for complete search history.

(56) References Cited

U.S. PATENT DOCUMENTS

| | | | | |
|---|---|---|---|---|
| 3,847,888 A * | 11/1974 | Baumgaertner | ............. | 428/220 |
| 4,373,887 A * | 2/1983 | Hanson et al. | ............. | 425/143 |
| 4,568,412 A * | 2/1986 | Atkins et al. | ................ | 216/83 |
| 4,570,055 A * | 2/1986 | McMills | ................ | 219/541 |
| 4,772,642 A * | 9/1988 | Staendeke | ................ | 523/205 |
| 5,286,576 A * | 2/1994 | Srail et al. | ................ | 428/517 |
| 5,425,817 A | 6/1995 | Mugge et al. | | |
| 5,484,830 A * | 1/1996 | Staendeke | ................ | 524/101 |
| 5,759,678 A * | 6/1998 | Fujii et al. | ............... | 428/315.5 |
| 6,136,948 A | 10/2000 | Dickens et al. | | |
| 6,207,736 B1 * | 3/2001 | Nass et al. | ................. | 524/126 |
| 6,245,281 B1 | 6/2001 | Scholten et al. | | |
| 6,766,091 B2 | 7/2004 | Beuth et al. | | |
| 6,884,485 B2 | 4/2005 | Baumann et al. | | |
| 7,087,109 B2 * | 8/2006 | Bredt et al. | ................. | 106/691 |
| 7,135,525 B2 | 11/2006 | Petter et al. | | |
| 7,148,286 B2 | 12/2006 | Baumann et al. | | |
| 7,211,615 B2 | 5/2007 | Baumann et al. | | |
| 7,317,044 B2 | 1/2008 | Monsheimer et al. | | |
| 7,491,792 B2 | 2/2009 | Monsheimer et al. | | |
| 2004/0102539 A1 | 5/2004 | Monsheimer et al. | | |
| 2004/0106691 A1 | 6/2004 | Monsheimer et al. | | |
| 2004/0137228 A1 | 7/2004 | Monsheimer et al. | | |
| 2004/0138363 A1 | 7/2004 | Baumann et al. | | |
| 2004/0140668 A1 | 7/2004 | Monsheimer et al. | | |
| 2004/0180980 A1 | 9/2004 | Petter et al. | | |
| 2004/0232583 A1 | 11/2004 | Monsheimer et al. | | |
| 2005/0014842 A1 | 1/2005 | Baumann et al. | | |
| 2005/0027047 A1 | 2/2005 | Monsheimer et al. | | |
| 2005/0027050 A1 | 2/2005 | Monsheimer et al. | | |
| 2005/0038201 A1 | 2/2005 | Wursche et al. | | |
| 2006/0041041 A1 * | 2/2006 | Douais et al. | ................ | 524/115 |
| 2006/0071359 A1 | 4/2006 | Monsheimer et al. | | |
| 2006/0134419 A1 | 6/2006 | Monsheimer et al. | | |
| 2006/0182916 A1 | 8/2006 | Dowe et al. | | |
| 2006/0183869 A1 | 8/2006 | Dowe et al. | | |
| 2006/0202395 A1 | 9/2006 | Monsheimer et al. | | |
| 2006/0223928 A1 | 10/2006 | Monsheimer et al. | | |
| 2006/0244169 A1 | 11/2006 | Monsheimer et al. | | |
| 2007/0055044 A1 | 3/2007 | Simon et al. | | |
| 2007/0126159 A1 | 6/2007 | Simon et al. | | |
| 2007/0182070 A1 | 8/2007 | Monsheimer et al. | | |
| 2007/0183918 A1 | 8/2007 | Monsheimer et al. | | |
| 2007/0197692 A1 | 8/2007 | Monsheimer et al. | | |
| 2007/0238056 A1 | 10/2007 | Baumann et al. | | |
| 2007/0260014 A1 | 11/2007 | Simon et al. | | |
| 2008/0116616 A1 | 5/2008 | Monsheimer et al. | | |

(Continued)

FOREIGN PATENT DOCUMENTS

EP    0 686 661    12/1995

(Continued)

OTHER PUBLICATIONS

U.S. Appl. No. 60/831,222, filed Jul. 17, 2006, Hager, et al.

(Continued)

*Primary Examiner*—Peter Szekely
(74) *Attorney, Agent, or Firm*—Oblon, Spivak, McClelland, Maier & Neustadt, L.L.P.

(57) ABSTRACT

The present invention relates to a powder which, in addition to a polymer, comprises a flame retardant based on ammonium polyphosphate, to the use of this powder for the layer-by-layer production of moldings, and also to moldings produced from this powder. The moldings constructed using the inventive powder have marked advantages with regard to their flammability, when comparison is made with conventional products, and this permits use in aircraft, for example.

64 Claims, No Drawings

U.S. PATENT DOCUMENTS

2008/0119632 A1 5/2008 Baumann et al.
2008/0166496 A1 7/2008 Monsheimer et al.
2008/0242782 A1 10/2008 Hager et al.
2008/0258346 A1 10/2008 Simon et al.
2008/0300353 A1 12/2008 Monsheimer et al.

FOREIGN PATENT DOCUMENTS

EP    1 179 568    2/2002

OTHER PUBLICATIONS

U.S. Appl. No. 12/407,065, filed Mar. 19, 2009, Monsheimer, et al.

* cited by examiner

POWDERY COMPOSITION OF A POLYMER AND A FLAMEPROOFING AGENT CONTAINING AMMONIUM POLYPHOSPHATE, METHOD FOR THE PRODUCTION THEREOF, AND MOULDED BODY PRODUCED FROM SAID POWDER

CROSS-REFERENCE TO RELATED APPLICATIONS

The present application is a continuation of U.S. application Ser. No. 10/565,779, now abondoned which was filed on Jan. 25, 2006, which is a National Stage (371) of PCT/EP04/51009, filed on Jun. 3, 2004, and claims priority to DE 1003 33 936.1, filed on Jul. 25, 2003, and DE 10 2004 001 324.1, filed on Jan. 8, 2004.

BACKGROUND OF THE INVENTION

The invention relates to a polymer powder which comprises at least one polymer and at least one flame retardant comprising ammonium polyphosphate, to a process for preparing this powder, and also to moldings produced by layer-by-layer application and fusion of this powder.

Very recently, a requirement has arisen for the rapid production of prototypes. The flexibility of processes which apply a pulverulent material layer-by-layer and selectively melt or bond this material makes these processes of particular interest.

Selective laser sintering is a process particularly well suited to rapid prototyping. In this process, polymer powders in a chamber are selectively irradiated briefly with a laser beam, resulting in melting of the particles of powder on which the laser beam falls. The molten particles coalesce and rapidly solidify again to give a solid mass. Three-dimensional bodies, including those of complex shape, can be produced simply and rapidly by this process, by repeatedly applying fresh layers and irradiating these.

The process of laser sintering (rapid prototyping) to realize moldings made from pulverulent polymers is described in detail in the patent specifications U.S. Pat. No. 6,136,948 and WO 96/06881 (both DTM Corporation). A wide variety of polymers and copolymers can be employed for this application, e.g. polyacetate, polypropylene, polyethylene, ionomers, and polyamide.

Polyamide-12 powder (PA 12) has proven particularly successful in industry for laser sintering to produce moldings, in particular to produce engineering components. The parts manufactured from PA 12 powder meet the high requirements demanded with regard to mechanical loading, and therefore have properties particularly close to those of the mass-production parts subsequently produced by extrusion or injection molding.

A PA 12 powder with good suitability here has a median particle size ($d_{50}$) of from 50 to 150 µm, and is obtained as in DE 197 08 946 or else DE 44 21 454, for example. It is preferable here to use a polyamide-12 powder whose melting point is from 185 to 189° C., whose enthalpy of fusion is 112±17 J/g, and whose solidification point is from 138 to 143° C., as described in EP 0 911 142.

Other processes with good suitability are the SIB process, as described in WO 01/38061 or EP 1 015 214. The two processes operate using infrared heating over an area to melt the powder, and selectivity of the melting is achieved in the first process by applying an inhibitor, and in the second process by way of a mask. Another process which has found wide acceptance in the market is 3D printing, as in EP 0 431 924; where the moldings are produced by curing of a binder applied selectively to the powder layer. Another process is described in DE 103 11 438. In this, the energy required for the fusion process is introduced by way of a microwave generator, and selectivity is achieved by applying a susceptor.

For the rapid prototyping or rapid manufacturing processes (RP or RM processes) mentioned, use may be made of pulverulent substrates, in particular polymers or copolymers, preferably selected from polyester, polyvinyl chloride, polyacetal, polypropylene, polyethylene, polystyrene, polycarbonate, poly(N-methylmethacrylimides) (PMMI), polymethyl methacrylate (PMMA), ionomer, polyamide, copolyester, copolyamides, terpolymers, acrylonitrile-butadiene-styrene copolymers (ABS), or a mixture of these.

Although the properties of the known polymer powders are already good, moldings produced using these powders still have some disadvantages. Particular disadvantages with the polymer powders currently used are their ready flammability and combustibility. This currently inhibits the use of the abovementioned processes in short production runs, for example in aircraft construction.

DISCUSSION OF THE INVENTION

It was therefore an object of the present invention to provide a polymer powder which can give lower flammability of the parts produced therefrom by one of the processes described above.

Surprisingly, it has now been found, as described in the claims, that addition of flame retardants comprising ammonium polyphosphate to polymers or copolymers can make it possible to prepare pulverulent compositions (powders) from which it is possible to produce moldings by a layer-by-layer process in which regions are selectively melted or bonded to one another, these moldings being markedly less flammable and combustible than moldings composed of conventional polymer powders.

The present invention therefore provides a pulverulent composition, in particular a construction powder or rapid-prototyping and rapid-manufacturing powder (RP/RM powder) for rapid-prototyping or rapid-manufacturing applications, for processing in a process for the layer-by-layer build-up of three-dimensional objects, by selectively bonding portions of the powder to one another, wherein the powder comprises at least one polymer and at least one flame retardant comprising ammonium polyphosphate, the maximum particle size of the powder being $\leqq 150$ µm.

The present invention also provides a process for preparing inventive powder (pulverulent composition) which comprises preparing a pulverulent mixture in which a polymer and a flame retardant comprising ammonium polyphosphate are present.

The present invention also provides the use of inventive powder for producing moldings by layer-by-layer processes which selectively bond the powder, and provides moldings produced by a process for the layer-by-layer build-up of three-dimensional objects, by selectively bonding portions of a powder to one another, where these comprise at least one flame retardant comprising ammonium polyphosphate and comprise at least one polymer.

An advantage of the inventive powder is that moldings which have lower combustibility and flammability can be produced therefrom by an RP or RM process as described above for the layer-by-layer build-up of three-dimensional objects, portions of the powder used being selectively bonded to one another. At the same time, the mechanical properties of the moldings are substantially retained. This opens up applications sectors which were inaccessible hitherto because of poor combustibility grading. Particularly surprisingly, it is possible to achieve the UL 94 (Underwriters Laboratories Inc., test method 94V) classification V-0 for the finished molding if minimum contents of flame retardant comprising ammonium polyphosphate are maintained within the powders.

Surprisingly, it was also found that moldings produced from the inventive powder have equally good, or even better, mechanical properties, in particular increased modulus of elasticity, tensile strength, and density. The moldings also have good appearance, for example good dimensional stability and surface quality.

The inventive powder is described below, as also is a process for its preparation, but there is no intention that the invention be restricted to these descriptions.

A feature of the inventive construction powder, or of the inventive pulverulent composition for processing in a process for the layer-by-layer build-up of three-dimensional objects in which portions of the powder are selectively bonded to one another, is that the powder comprises at least one polymer and at least one flame retardant comprising ammonium polyphosphate, and has maximum particle size of $\leq 150$ µm, preferably from 20 to 100 µm. In these processes, the powder is preferably bonded by introducing energy, particularly preferably by exposure to heat, whereupon the particles are bonded to one another by fusion or sintering. The powder may also be used in processes in which the particles are bonded to one another by chemical reaction or by a binder or by physical measures, preferably drying or adhesion. Details concerning the individual processes may be found in the abovementioned publications.

The polymer, and also the flame retardant, may be present in the inventive powder in the form of a mixture of the respective powders, or in the form of a powder in which most of the grains, or every grain, comprises not only polymer but also flame retardant. In the case of these powders, the distribution of the flame retardant may be homogeneous within the particles, or the concentration of the flame retardant may be greater in the center of the particle or at the surface of the particle.

The polymer present in the powder is preferably a homo-or copolymer selected from polyester, polyvinyl chloride, polyacetal, polypropylene, polyethylene, polystyrene, polycarbonate, poly(N-methylmethacrylimides) (PMMI), polymethyl methacrylate (PMMA), ionomer, polyamide, copolyester, copolyamides, terpolymers, acrylonitrile-butadiene-styrene copolymers (ABS), or is a mixture of these. The inventive powder particularly preferably comprises a polymer which has a melting point of from 50 to 350° C., preferably from 70 to 200° C.

The polymers present in the inventive powder may in particular be prepared by milling, precipitation and/or anionic polymerization, or by a combination of these, or by subsequent fractionation.

In particular if the powder is intended to be used for the selective laser sintering process, the inventive powder preferably comprises at least one polyamide. The polyamide present in the inventive powder is preferably a polyamide which has at least 8 carbon atoms per carboxamide group. The inventive powder preferably comprises at least one polyamide which contains 9 or more carbon atoms per carboxamide group. The powder very particularly preferably comprises at least one polyamide selected from polyamide-6,12 (PA 612), polyamide-11 (PA 11) and polyamide-12 (PA 12), or copolyamides based on the abovementioned polyamides. The inventive powder preferably comprises an unregulated polyamide.

A polyamide-12 sinter powder particularly suitable for the laser sintering process is one whose melting point is from 185 to 189° C., preferably from 186 to 188° C., whose enthalpy of fusion is 112±17 J/g, preferably from 100 to 125 J/g, and whose solidification point is from 133 to 148° C., preferably from 139 to 143° C. The preparation process for the polyamide powders underlying the inventive sinter powders is well known and, in the case of PA 12, can be found, for example, in the specifications DE 29 06 647, DE 35 10 687, DE 35 10 691, and DE 44 21 454, the content of which is incorporated by way of reference into the disclosure of the present invention. The polyamide pellets needed can be purchased from various producers, and by way of example polyamide-12 pellets are supplied by Degussa AG under the trade name VESTAMID.

A material which likewise has particularly good suitability is polyamide-12 whose melting point is from 185 to 189° C., preferably from 186 to 188° C., whose enthalpy of fusion is 120±17 J/g, preferably from 110 to 130 J/g, and whose solidification point is from 130 to 140° C., preferably from 135 to 138° C., and whose crystallization point after aging is also preferably from 135 to 140° C. These test values were determined by means of DSC, as described in EP 0 911 142.

A powder which comprises a copolymer, in particular one which is a copolyamide, has particularly good suitability for the processes for producing three-dimensional objects without use of a laser.

Based on the entirety of polymers present in the powder, the inventive powder preferably comprises from 5 to 50% by weight of a flame retardant comprising ammonium polyphosphate, with preference comprises from 10 to 40% by weight of a flame retardant comprising ammonium polyphosphate, and particularly preferably comprises from 20 to 35% by weight of a flame retardant comprising ammonium polyphosphate, and very particularly preferably comprises from 23 to 34% by weight of a flame retardant comprising ammonium polyphosphate. The ranges given here refer to the entire content of a flame retardant comprising ammonium polyphosphate present in the powder, where powder means the entire amount of components.

The inventive powder may comprise polymer particles mixed with a flame retardant comprising ammonium polyphosphate, or else may comprise polymer particles or polymer powder which comprise incorporated flame retardant comprising ammonium polyphosphate. If the proportion of a flame retardant comprising ammonium polyphosphate is below 5% by weight, based on the entire amount of components, the desired effect of low flammability and incombustibility is markedly reduced. If the proportion of a flame retardant comprising ammonium polyphosphate is above 50% by weight, based on the entire amount of components, mechanical properties, such as strain at break, of the moldings produced from these powders are markedly impaired.

If the powder comprises polymer particles mixed with a flame retardant comprising ammonium polyphosphate, the maximum size of the polymer particles is 150 µm, and their median particle size is preferably from 20 to 100 µm, particularly preferably from 45 to 80 µm. The particle size of the flame retardant comprising ammonium polyphosphate is preferably below the median grain size $d_{50}$ of the polymer particles or polymer powder by at least 20%, preferably by more than 50% and very particularly preferably by more than 70%. In particular, the median particle size of the flame retardant component is from 1 to 50 µm, preferably from 5 to 15

µm. The small particle size gives good dispersion of the pulverulent flame retardant within the polymer powder.

The flame retardants present in the inventive powder comprises ammonium polyphosphate as principal component. The phosphorus content in the ammonium polyphosphate here is preferably from 10 to 35% by weight, preferably from 15 to 32% by weight, and very particularly preferably from 20 to 32% by weight. The flame retardant is preferably halogen-free. However, it may comprise synergists, such as carbon-forming materials, e.g. polyalcohols or pentaerythritol, and/ or, by way of example, an intumescent (foaming) component, for example melamine. Sulfur may also be present in the composition. If the flame retardant is a powder, it may also comprise a coating, in order to provide compatibility, or in order to increase the moisture-resistance of the ammonium polyphosphate. These coated flame retardants are obtainable from Budenheim Iberica under the name Budit, for example.

General commercially available examples of flame retardants comprising ammonium polyphosphate are Budit 3076 DCD or Budit 3076 DCD-2000 from the Company Budenheim Iberica, or products from the Exolit AP line, such as Exolit AP 750 or Exolit AP 422 from the Company Clariant.

In addition, inventive powder may comprise at least one auxiliary, at least one filler, and/or at least one pigment. By way of example, these auxiliaries may be flow aids, e.g. fumed silicon dioxide, or else precipitated silicic acid. Fumed silicon dioxide (fumed silicic acid) is supplied by Degussa AG under the product name Aerosil® with various specifications, for example. In particular, the flow aids may be hydrophobic flow aids. Inventive powder preferably comprises less than 3% by weight, with preference from 0.001 to 2% by weight, and very particularly preferably from 0.05 to 1% by weight, of these auxiliaries, based on the entirety of components, i.e. on the entirety of polymers and flame retardant. By way of example, the fillers may be glass particles, metal particles, in particular aluminum particles, or ceramic particles, e.g. solid or hollow glass beads, steel shot, aluminum spheres, or granulated metal, or else color pigments, e.g. transition metal oxides.

The median grain size of the filler particles here is preferably smaller than, or approximately equal to, that of the particles of the polymers. The extent to which the median grain size $d_{50}$ of the fillers exceeds the median grain size $d_{50}$ of the polymers should preferably be not more than 20%, with preference not more than 15%, and very particularly preferably not more than 5%. A particular limit on the particle size arises via the permissible overall height or layer thickness in the particular apparatus used for the layer-by-layer process.

Inventive powder preferably comprises less than 70% by weight, with preference from 0.001 to 60% by weight, particularly preferably from 0.05 to 50% by weight, and very particularly preferably from 0.5 to 25% by weight, of these fillers, based on the entirety of components, such that the proportion by volume of the polymers is always greater than 50%.

If the stated maximum limits for auxiliaries and/or fillers are exceeded, depending on the filler or auxiliary used, the result can be marked impairment of the mechanical properties of moldings produced using these powders.

The inventive powders may be prepared in a simple manner, preferably by the inventive process for preparing inventive powder, by mixing at least one polymer with at least one flame retardant comprising ammonium polyphosphate. The dry blend mixing process may be used for dry mixing. In a preferred method, a polymer powder obtained, by way of example, by reprecipitation and/or milling, which may also subsequently be fractionated, is mixed with the flame retardant comprising ammonium polyphosphate. It can be advantageous here to provide a flow aid initially to the pulverulent flame retardant alone, or else to the finished mixture, for example one from the Aerosil R line from Degussa, e.g. Aerosil R972 or R812. In another variant of the process, the flame retardant comprising ammonium polyphosphate may be compounded into a melt of at least one polymer, and the resultant mixture may be processed by milling to give powder. The processing of ammonium polyphosphate-based flame retardants in the compounding is described by way of example in Plastics Additives & Compounding, April 2002, Elsevier Advanced Technology, pp. 28 to 33.

In the simplest embodiment of the inventive process, by way of example, fine-particle mixing may take place by a mixing process which applies finely pulverized flame retardant to the dry powder in high-speed mechanical mixers.

In one of these first variants of the inventive process, the powder may be a polymer powder which is itself suitable for the layer-by-layer rapid prototyping process, fine particles of the flame retardant simply being admixed with this powder. The median grain size of the particles here is preferably smaller than, or at most approximately equal to, that of the particles of the polymers. The extent to which the median grain size $d_{50}$ of the flame retardant particles is less than the median grain size $d_{50}$ of the polymer powders should preferably be more than 20%, with preference more than 50%, and very particularly preferably more than 70%. A particular upward limit on the grain size arises via the permissible overall height or layer thickness in the rapid prototyping system.

It is also possible to mix conventional polymer powders with inventive powders. This method can prepare powders with an optimal combination of mechanical and flame-retardant properties. By way of example, the process for preparing mixtures of this type may be found in DE 34 41 708.

In another variant of the process, the flame retardant is mixed with a, preferably molten, polymer via incorporation by compounding, and the resultant polymer comprising flame retardant is processed by (low temperature) milling and, where appropriate, fractionation to give inventive powder. The compounding generally gives pellets which are then processed to give powder. An example of a method for this conversion process is milling. The process variant in which the flame retardant is incorporated by compounding has the advantage over the pure mixing process of giving more homogeneous distribution of the flame retardant within the powder.

Where appropriate, a suitable flow aid, such as fumed aluminum oxide, fumed silicon dioxide, or fumed titanium dioxide, may be added externally to the precipitated or low-temperature-milled powder, in order to improve flow performance.

A flow-control agent, such a metal soaps, preferably the alkali metal or alkaline earth metal salts of the underlying alkanemonocarboxylic acids or dimer acids, may be added to the precipitated or low-temperature-milled powder in order to improve melt flow during the production of the moldings.

Flame retardants that may be used are commercially available products, for example those which may be purchased from Budenheim Iberica or Clariant under the trade name Exolit AP® or Budit®, or those described above.

The amounts used of the metal soaps are from 0.01 to 30% by weight, preferably from 0.5 to 15% by weight, based on the entirety of polyamides present in the powder. Metal soaps preferably used are the sodium or calcium salts of the underlying alkanemonocarboxylic acids or dimer acids. Examples of commercially available products are Licomont NaV or Licomont CaV from Clariant.

The metal soap particles may be incorporated into the polyamide particles, or else fine metal soap particles may have been mixed with polyamide particles.

In order to improve processability, or for further modification of the powder, this may treated with inorganic pigments, in particular color pigments, e.g. transition metal oxides, stabilizers, e.g. phenols, in particular sterically hindered phenols, flow control agents and flow aids, e.g. fumed silicic acids, and also filler particles. Based on the total weight of components in the powder, the amount of these substances added to the powder is preferably such as to comply with the stated concentrations for fillers and/or auxiliaries for the inventive powder. The present invention also provides the use of inventive powder for producing moldings in a layer-by-layer process which selectively bonds the powder (rapid prototyping or rapid manufacturing), these being processes which use inventive powders, the polymers, and a flame retardant comprising ammonium polyphosphate, preferably each in particulate form.

The present invention in particular provides the use of the powder for producing moldings via selective laser sintering of a precipitation powder comprising flame retardant and based on a polyamide-12 which has a melting point of from 185 to 189° C., and enthalpy of fusion of 112±17 J/g, and a solidification point of from 136 to 145° C., and the use of which is described in U.S. Pat. No. 6,245,281.

Laser sintering processes are sufficiently well known, and are based on the selective sintering of polymer particles, where layers of polymer particles are briefly exposed to laser light and the polymer particles exposed to the laser light are thus bonded to one another. Successive sintering of layers of polymer particles produces three-dimensional objects. Details concerning the selective laser sintering process are found, by way of example, in the specifications U.S. Pat. No. 6,136,948 and WO 96/06881. However, the inventive powder may also be used in other rapid prototyping or rapid manufacturing processing of the prior art, in particular in those described above. For example, the inventive powder may in particular be used for producing moldings from powders via the SLS (selective laser sintering) process, as described in U.S. Pat. No. 6,136,948 or WO 96/06881, via the SIB process (selective inhibition of bonding of powder), as described in WO 01/38061, via 3D printing, as described in EP 0 431 924, or via a microwave process, as described in DE 103 11 438. The specifications cited, and in particular the processes described therein, are expressly incorporated into the disclosure content of the present description of the invention by way of reference.

Careful handling of the inventive powders is advisable because the flame retardants are air-sensitive. In particular, prolonged contact of the inventive powder with air or with atmospheric moisture is to be avoided. The sensitivity of the inventive powder can be reduced by using hydrophobic flow aids, thus permitting avoidance of any reduction in modulus of elasticity which is sometimes caused by the decomposition products of ammonium polyphosphate.

The inventive moldings, produced via a process for the layer-by-layer build-up of three-dimensional objects, in which portions of a powder, in particular of the inventive powder, are selectively bonded to one another, e.g. selective laser sintering, comprise at least one flame retardant comprising ammonium polyphosphate and comprise at least one polymer, or are composed of at least one flame retardant comprising ammonium polyphosphate and of at least one polymer. The inventive moldings preferably comprise at least one polyamide which contains at least 8 carbon atoms per carboxamide group. Inventive moldings very particularly preferably comprise at least one polyamide-6,12, polyamide-11 and/or one polyamide-12, or copolyamides based on these polyamides, and comprise at least one flame retardant comprising ammonium polyphosphate.

The flame retardant present in the inventive molding is based on ammonium polyphosphate. The inventive molding preferably comprises, based on the entirety of components present in the molding, from 5 to 50% by weight of flame retardant comprising ammonium polyphosphate, preferably from 10 to 40% by weight, particularly preferably from 20 to 35% by weight, and very particularly preferably from 23 to 24% by weight. The proportion of flame retardant comprising ammonium polyphosphate is preferably at most 50% by weight, based on the entirety of components present in the molding. Based on the entirety of polymers present, the molding comprises from 30 to 35% by weight of flame retardant comprising ammonium polyphosphate.

Besides polymer and flame retardant, the moldings may also comprise fillers and/or auxiliaries, and/or pigments, e.g. heat stabilizers and/or antioxidants, e.g. sterically hindered phenol derivatives. Examples of fillers may be glass particles, ceramic particles, or else metal particles, e.g. iron shot, or corresponding hollow spheres. The inventive moldings preferably comprise glass particles, very particularly preferably glass beads. Inventive moldings preferably comprise less than 3% by weight, with preference from 0.001 to 2% by weight, and very particularly preferably from 0.05 to 1% by weight, of these auxiliaries, based on the entirety of components present. Inventive moldings likewise preferably comprise less than 75% by weight, with preference from 0.001 to 70% by weight, particularly preferably from 0.05 to 50% by weight, and very particularly preferably from 0.5 to 25% by weight, of theses fillers, based on the entirety of components present.

EXAMPLES

The examples below are intended to describe the inventive pulverulent composition, and also its use, without restricting the invention to the examples.

The method used in the following examples for BET surface area determination complied with DIN 66 131. Bulk density was determined using an apparatus to DIN 53 466. A Malvern Mastersizer S, version 2.18, was used to obtain the laser scattering values.

Example 1

Comparative Example (Non-inventive)

40 kg of unregulated PA 12 prepared by hydrolytic polymerization by a method based on DE 35 10 691, example 1, and having a relative solution viscosity $\eta_{rel}$ of 1.61 (in acidified m-cresol) and having an end-group content of 72 mmol/kg of COOH and, respectively, 68 mmol/kg of $NH_2$ are heated to 145° C. within a period of 5 hours in a 0.8 $m^3$ stirred tank (D=90 cm, h=170 cm) with 0.3 kg of IRGANOX® 1098 in 350 l of ethanol, denatured with 2-butanone and 1% water content, and held at this temperature for 1 hour, with stirring (blade stirrer, d=42 cm, rotation rate=91 rpm). The jacket temperature is then reduced to 120° C., and the internal temperature is brought to 120° C. at a cooling rate of 45 K/h, using the same stirrer rotation rate. From this juncture onward, the jacket temperature is held at from 2 to 3 K below the internal temperature, using the same cooling rate. The internal temperature is brought to 117° C., using the same cooling rate, and then held constant for 60 minutes. The internal temperature is then brought to 111° C., using a cooling rate of 40 K/h. At this temperature the precipitation begins and is detectable via evolution of heat. After 25 minutes the internal temperature falls, indicating the end of the precipitation. After cooling of the suspension to 75° C., the suspension is transferred to a paddle dryer. The ethanol is distilled off from the material at 70° C. and 400 mbar, with stirring, and the residue is then further dried at 20 mbar and 85° C. for 3 hours.

| | |
|---|---|
| BET: | 6.9 m$^2$/g |
| Bulk density: | 429 g/l |
| Laser scattering: | d(10%): 42 µm, |
| | d(50%): 69 µm, |
| | d(90%): 91 µm |

Example 2

Incorporation of Budit 3076 DCD via Compounding Followed by Milling 40 kg of unregulated PA 12, of the type represented by Vestamid L1600 from Degussa AG, and prepared by hydrolytic polymerization are extruded with 0.3 kg of IRGANOX® 245 and 12 kg (30 parts) of flame retardant (Budit 3076 DCD, Budenheim Iberica) at 220° C. in a twin-screw compounding machine (Bersttorf ZE25), and strand-pelletized. The pellets are then milled at low temperatures (−40° C.) in an impact mill to give a grain size distribution from 0 to 120 µm. 40 g of Aerosil 200 (0.1 part) are then mixed into the material at room temperature and 500 rpm for 3 minutes.

Example 3

Incorporation of Budit 3076 DCD-2000 in a Dry Blend Process 1023 g (35 parts) of Budit 3076 DCD-2000 are mixed within a period of 3 minutes with 1900 g (65 parts) of polyamide-12 powder, prepared as in DE 29 06 647, example 1, and having a median grain diameter $d_{50}$ of 56 µm (laser scattering) and a bulk density of 459 g/l to DIN 53 466, in a dry blend process utilizing a FML10/KM23 Henschel mixer at 700 rpm and at 50° C. 1.5 g of Aerosil R812 (0.05 part) were then mixed into the material within a period of 3 minutes at room temperature and 500 rpm.

Other powders comprising 10, 20, 25, 30 and 35 parts of Budit 3076 DCD-2000 flame retardant were prepared under the same conditions.

Example 4

Incorporation of Budit 3076 DCD and Metal Soap in a Dry Blend Process 814 g (30 parts) of Budit 3076 DCD are mixed within a period of 3 minutes with 1900 g (70 parts) of polyamide-12 powder, prepared as in DE 29 06 647, example 1, and having a median grain diameter $d_{50}$ of 56 µm (laser scattering) and a bulk density of 459 g/l to DIN 53 466, in a dry blend process utilizing a FML10/KM23 Henschel mixer at 700 rpm and at 50° C. 54 g (2 parts) of Licomont NaV and 2 g of Aerosil 200 (0.1 part) were then mixed into the material within a period of 3 minutes at room temperature and 500 rpm.

Example 5

Incorporation of Exolit AP 422 in a Dry Blend Process 475 g (20 parts) of Exolit AP 422 are mixed within a period of 3 minutes with 1900 g (80 parts) of polyamide-12 powder, prepared as in DE 29 06 647, example 1, and having a median grain diameter $d_{50}$ of 56 µm (laser scattering) and a bulk density of 459 g/l to DIN 53 466, in a dry blend process utilizing a FML10/KM23 Henschel mixer at 700 rpm and at 50° C. 2.4 g of Aerosil R 200 (0.1 part) were then mixed into the material within a period of 3 minutes at room temperature and 500 rpm.

Other powders comprising 10, 25, 30 and 35 parts of Exolit AP 422 flame retardant were prepared under the same conditions.

Further Processing and Testing

The powders from examples 1 to 4 were used in a laser sintering machine to build up bars for the UL 94V fire-protection test, and also to build up multipurpose bars to ISO 3167. The latter components were used to determine mechanical properties by means of a tensile test to EN ISO 527 (table 1). The UL bars were used for the vertical UL 94V (Underwriters Laboratories Inc.) combustion test. The bars have specified dimensions of 3.2*10*80 mm. Each was produced on an EOSINT P360 laser sintering machine from EOS GmbH.

TABLE 1

Test results from the samples of examples 1 to 3

| Examples | Test bar thickness [mm] | Modulus of elasticity N/mm$^2$ | Total UL burning time [s] | UL classification |
|---|---|---|---|---|
| Molding composed of material from example 1 | 3.9 | 1688 | >167 | none |
| Molding composed of material from example 2 | 3.6 | 1890 | 19 | V-0 |
| Molding composed of material from example 4, 30% of Budit 3076 DCD-2000 | 3.6 | 1860 | 11 | V-0 |
| Molding composed of material from example 3, 30% of Budit 3076 DCD-2000 | 3.6 | 1885 | 10 | V-0 |
| Molding composed of material from example 3, 35% of Budit 3076 DCD-2000 | 3.6 | 2031 | 9 | V-0 |
| Molding composed of material from example 5, 30% of Exolit AP 422 | 3.7 | 2313 | 10 | V-0 |
| Molding composed of material from example 5, 20% of Exolit AP 422 | 3.7 | 2207 | 10 | V-0 |

(none: no classification into any of the grades V-0 to V-2 was possible. The bars are thicker than the specified thickness, this being attributable firstly to the z compensation (the laser beam reaches more than one layer thickness since, of course, it also has to reach the layer boundary, but this is more than required for the first layer), and secondly to the slightly intumescent (foaming) action of some flame retardants.

It can clearly be seen that the addition of flame retardant based on ammonium polyphosphate to the polymer powder can produce moldings whose UL classification is markedly better. The addition of the flame retardant moreover increases the modulus of elasticity and the tensile strength, but there is a simultaneous reduction in the elongation at break.

What is claimed is:

1. A pulverulent composition, wherein the pulverulent composition is a powder comprising: at least one polymer, at least one flame retardant that comprises ammonium polyphosphate, and a metal soap from 0.01 to 30% by weight based on the total amount of polymer present in the powder wherein the powder has a maximum particle size of $\leq 150$ µm and wherein the powder has a median particle size of from 20 to 100 µm.

2. The pulverulent composition as claimed in claim 1, wherein the polymer is prepared by at least one of milling, precipitation, anionic polymerization, or by a combination of these, or by subsequent fractionation.

3. The pulverulent composition as claimed in claim 1, wherein the polymer is at least one polymer selected from the group consisting of polyester, polyvinyl chloride, polyacetal, polypropylene, polyethylene, polystyrene, polycarbonate, poly-(N-methylmethacrylimides) (PMMI), polymethyl methacrylate (PMMA), ionomer, polyamide, copolyester, copolyamides, terpolymers, and acrylonitrile-butadiene-styrene copolymers (ABS), or a copolymer comprising at least two polymers selected from the group consisting of polyester, polyvinyl chloride, polyacetal, polypropylene, polyethylene, polystyrene, polycarbonate, poly-(N-methylmethacrylimides) (PMMI), polymethyl methacrylate (PMMA), ionomer, polyamide, copolyester, copolyamides, terpolymers, and acrylonitrile-butadiene-styrene copolymers (ABS).

4. The pulverulent composition as claimed in claim 1, wherein the polymer is a polyamide.

5. The pulverulent composition as claimed in claim 1, wherein the polymer is polyamide-6,12, polyamide-11, polyamide-12, or a copolymer of these polyamides.

6. The pulverulent composition as claimed in claim 1, wherein the polymer has a melting point of from 50 to 350 °C.

7. The pulverulent composition as claimed in claim 6, wherein the polymer has a melting point of from 70 to 200 °C.

8. The pulverulent composition as claimed in claim 1, further comprising at least one auxiliary, filler, or pigment.

9. The pulverulent composition as claimed in claim 8, which comprises a flow aid as an auxiliary.

10. The pulverulent composition as claimed in claim 1, wherein the ammonium polyphosphate contains from 10 to 35% by weight of phosphorus.

11. The pulverulent composition as claimed in claim 1, wherein the flame retardant component comprises a synergist with the ammonium polyphosphate.

12. The pulverulent composition as claimed in claim 1, wherein the flame retardant component is in a pulverulent form with a median particle size of from 1 to 50 µm.

13. The pulverulent composition as claimed in claim 1, wherein the flame retardant component is in a pulverulent and a coated form.

14. The pulverulent composition as claimed in claim 1, wherein the metal soap is present in an amount of from 0.5 to 15% by weight based on the total amount of polymer present in the powder.

15. The pulverulent composition as claimed in claim 1, wherein said metal soap are is in the form of metal soap particles which are mixed with polymer particles.

16. The pulverulent composition as claimed in claim 1, wherein said metal soap is incorporated within polymer particles.

17. The pulverulent composition as claimed in claim 16, wherein the metal soap is an alkali metal or alkaline earth metal salt of an alkanemonocarboxylic acid.

18. The pulverulent composition as claimed in claim 16, wherein the metal soap is sodium or calcium salt of an alkanemonocarboxylic acid or dimer acid.

19. A process for preparing a pulverulent composition which is a powder comprising:
at least one polymer; and at least one flame retardant that comprises ammonium polyphosphate, wherein the powder has a maximum particle size of $\leq 150$ µm,
wherein the process comprising comprises:
mixing the at least one polymer with a flame retardant comprising ammonium polyphosphate which is compounded into a melt of polymer, and the resultant mixture is processed by milling to produce a powder wherein the flame retardant comprising ammonium polyphosphate is compounded into a melt of polymer, and the resultant mixture is processed by milling to produce a powder.

20. The process as claimed in claim 19, wherein the polymer powder is obtained by reprecipitation or milling, and is mixed in a dry blend process with the flame retardant comprising ammonium polyphosphate.

21. A method for producing moldings by a layer-by-layer process which selectively bonds the powder, the method comprising:
adding the pulverulent composition of claim 1 to a molding mixture.

22. The method of claim 21, wherein the moldings are produced by selective laser sintering, selective inhibition of the bonding of powders, 3D printing, or a microwave process.

23. A molding, produced by a process for the layer-by-layer build-up of three-dimensional objects by selectively bonding portions of a powder to one another, the molding comprising:
at least one flame retardant that comprises ammonium polyphosphate, at least one polymer, and a metal soap in an amount of from 0.5 to 15% by weight, based on the total amount of the polyamides present in the powder, wherein the powder has a maximum particle size of $\leq 150$ µm and wherein the powder has a median particle size of from 20 to 100 µm.

24. The molding as claimed in claim 23, wherein the polymer is a polyamide.

25. The molding as claimed in claim 24, wherein said polyamide contains at least 8 carbon atoms per carboxamide group.

26. The molding as claimed in claim 23, wherein the polymer is polyamide-6,12, polyamide-11, polyamide-12, or a copolymer of these polyamides.

27. The molding as claimed in claim 23, wherein the flame retardant is present in an amount of from 5 to 50% by weight, based on the total amount of components present, and wherein the flame retardant comprises ammonium polyphosphate.

28. The molding as claimed in claim 23, which, wherein the flame retardant is present in an amount of from 30 to 35% by weight, based on the total amount of the polymers present, and wherein the flame retardant comprises ammonium polyphosphate.

29. The molding as claimed in claim 23, further comprising fillers and/or pigments.

30. The molding as claimed in claim 23, further comprising a metal soap in an amount of from 0.01 to 30% by weight, based on the total amount of the polyamides present in the powder.

31. The molding as claimed in claim 23, wherein said metal soap are is in the form of metal soap particles which are mixed with polyamide particles.

32. The molding as claimed in claim 23, wherein the powder comprises the metal soap incorporated within polyamide particles.

33. The molding as claimed in claim 32, wherein the metal soap is an alkali metal or alkaline earth metal salt of an alkanemonocarboxylic acid or dimer acid.

34. The molding as claimed in claim 32, wherein the metal soap is a sodium or calcium salt of an alkanemonocarboxylic acid or dimer acid.

35. A pulverulent composition, wherein the pulverulent composition is a powder comprising: at least one polyamide; and at least one flame retardant that comprises ammonium polyphosphate, wherein the powder has a maximum particle size of $\leqq 150$ μm and wherein the powder has a median particle size of from 20 to 100 μm.

36. The pulverulent composition as claimed in claim 35, wherein the polyamide is prepared by at least one of milling, precipitation, anionic polymerization, or by a combination of these, or by subsequent fractionation.

37. The pulverulent composition as claimed in claim 35, wherein the polyamide is polyamide-6,12, polyamide-11, polyamide-12, or a copolymer of these polyamides.

38. The pulverulent composition as claimed in claim 35, wherein the polyamide has a melting point of from 50 to 350° C.

39. The pulverulent composition as claimed in claim 38, wherein the polyamide has a melting point of from 70 to 200° C.

40. The pulverulent composition as claimed in claim 35, further comprising at least one auxiliary, filler, or pigment.

41. The pulverulent composition as claimed in claim 40, which comprises a flow aid as an auxiliary.

42. The pulverulent composition as claimed in claim 35, wherein the ammonium polyphosphate contains from 10 to 35% by weight of phosphorus.

43. The pulverulent composition as claimed in claim 35, wherein the flame retardant component comprises a synergist with the ammonium polyphosphate.

44. The pulverulent composition as claimed in claim 35, wherein the flame retardant component is in a pulverulent form with a median particle size of from 1 to 50 μm.

45. The pulverulent composition as claimed in claim 35, wherein the flame retardant component is in a pulverulent and a coated form.

46. The pulverulent composition as claimed in claim 35, further comprising a metal soap in an amount of from 0.5 to 15% by weight based on the total amount of the polyamide present in the powder.

47. The pulverulent composition as claimed in claim 35, further comprising a metal soap in the form of metal soap particles which are mixed with the polyamide particles.

48. The pulverulent composition as claimed in claim 35, wherein said polyamide contains at least 8 carbon atoms per carboxamide group.

49. The pulverulent composition as claimed in claim 35, further comprising metal soaps incorporated within the polyamide particles.

50. The pulverulent composition as claimed in claim 49, wherein the metal soap is an alkali metal or alkaline earth metal salt of an alkanemonocarboxylic acid or dimer acid.

51. The pulverulent composition as claimed in claim 49, wherein the metal soap is sodium or calcium salt of an alkanemonocarboxylic acid or dimer acid.

52. A method for producing moldings by a layer-by-layer process which selectively bonds the powder, the method comprising:
adding the pulverulent composition of claim 35 to a molding mixture.

53. The method of claim 52, wherein the moldings are produced by selective laser sintering, selective inhibition of the bonding of powders, 3D printing, or a microwave process.

54. A molding, produced by a process for the layer-by-layer build-up of three-dimensional objects by selectively bonding portions of a powder to one another, the molding comprising:
at least one flame retardant that comprises ammonium polyphosphate, at least one polyamide, wherein the powder has a maximum particle size of $\leqq 150$ μm and wherein the powder has a median particle size of from 20 to 100 μm.

55. The molding as claimed in claim 54, wherein said polyamide contains at least 8 carbon atoms per carboxamide group.

56. The molding as claimed in claim 54, wherein said polyamide is polyamide-6,12, polyamide-11, polyamide-12, or a copolymer of these polyamides.

57. The molding as claimed in claim 54, wherein the flame retardant is present in an amount of from 5 to 50% by weight, based on the total amount of components present, and wherein the flame retardant comprises ammonium polyphosphate.

58. The molding as claimed in claim 54, wherein the flame retardant is present in an amount of from 30 to 35% by weight, based on the total amount of the polymers present, and wherein the flame retardant comprises ammonium polyphosphate.

59. The molding as claimed in claim 54, further comprising fillers and/or pigments.

60. The molding as claimed in claim 54, further comprising a metal soap in an amount of from 0.01 to 30% by weight, based on the total amount of the polyamides present in the powder.

61. The molding as claimed in claim 54, further comprising a metal soap in the form of metal soap particles which are mixed with polyamide particles.

62. The molding as claimed in claim 54, wherein the powder comprises a metal soap incorporated within polyamide particles.

63. The molding as claimed in claim 62, wherein the metal soap is an alkali metal or alkaline earth metal salt of an alkanemonocarboxylic acid or dimer acid.

64. The molding as claimed in claim 62, wherein the metal soap is a sodium or calcium salt of an alkanemonocarboxylic acid or dimer acid.

* * * * *